United States Patent [19]
Keilmann

[11] Patent Number: 5,875,726
[45] Date of Patent: Mar. 2, 1999

[54] SEWING APPARATUS

[75] Inventor: Robert Horst Keilmann, Lorsch, Germany

[73] Assignee: KSL Keilmann Sondermaschinenbau GmbH, Germany

[21] Appl. No.: 533,073

[22] Filed: Sep. 25, 1995

[51] Int. Cl.[6] .................................................... D05B 21/00
[52] U.S. Cl. ................................ 112/470.13; 112/475.08; 901/41
[58] Field of Search .......................... 112/470.13, 470.06, 112/2, 63, 475.05, 475.08, 470.12, 475.01; 901/15, 16, 17, 30, 41

[56] References Cited

U.S. PATENT DOCUMENTS

| | | | |
|---|---|---|---|
| 4,957,054 | 9/1990 | Sakuma et al. | 112/470.13 X |
| 5,313,897 | 5/1994 | Katamine et al. | 112/470.13 |
| 5,381,743 | 1/1995 | Moll | 112/470.13 |
| 5,458,075 | 10/1995 | Tice et al. | 112/470.06 X |

*Primary Examiner*—Peter Nerbun
*Attorney, Agent, or Firm*—Fitch, Even, Tabin & Flannery

[57] ABSTRACT

A sewing machine for producing a seam along a three-dimensional bent curve including first and second carriers for supporting a needle system and a looper system for translation along and rotation about three coordinate axes and first control means for synchronizing needle and looper drives and second control means for operating positioning devices for positioning the needle system and looper system to provide a differential spatial relationship between the needle system and the looper system before and after the sewing operation and for synchronizing the positioning devices.

9 Claims, 4 Drawing Sheets

SEWING APPARATUS

BACKGROUND OF THE INVENTION

The present invention relates to a sewing apparatus capable of producing a seam along a three-dimensional bent curve.

There are known devices wherein the needle system is mechanically coupled to the looper system and is movable along two coordinate axes, i.e., in the plane of the material to be sewn. Such sewing devices operate successfully for planar workpieces.

However, there are numerous products having seams, wherein the seam, in the finished product, forms a curve in space. Furthermore, in products which consist of several and/or thicker layers of material sewn together, there arises the problem that, although it might be possible to sew the layers together in a planar condition, wrinkles are produced on the inner side of the curvature when bending the multi-layered structure thus produced, while a considerable stress is put on the material and especially on the seam at the outer side of the curvature by the resulting tension. Therefore, there has been the need to sew the layers of such products together in a condition which corresponds to the shape of the finished product.

A sewing machine is known from the European lay-open print 0 107 910, wherein the needle system and the looper system are arranged on an essentially vertical carrier in such a way that they are movable relative to one another in the direction of the needle axis, and that they can be rotated about the needle axis into four positions spaced apart from one another by angles of 90°. The carrier itself is translationally movable along a horizontal coordinate axis and is pivotable about this axis about a limited angle of 15°. The workpiece is clamped in a support by means of which it is translationally movable along the second horizontal coordinate axis, as well as rotatable about said axis. This allows to sew seams in a cylindrically curved workpiece parallel to the cylinder axis and in the circumferential direction of the workpiece. Because of the mechanical limitations, this device is not suited for sewing along freely selectable three-dimensional spatial curves. Furthermore, the arrangement does not allow to produce seams in hollow bodies.

U.S. Pat. No. 3,515,080 describes a sewing device, wherein the needle system and the looper system are translationally movable along all three coordinate axes and rotatable about said axes, wherein the needle system and the looper system are drivable mechanically independent of one another and are merely interconnected via an electronic circuit. The embodiment shown in the above-mentioned patent shows a sewing device wherein the needle system and the looper system are movable along two horizontal coordinate axes and are rotatable about the third coordinate axis. This only allows to produce seams in a horizontal plane. The above-mentioned patent does not disclose how the needle system and the looper system are to be arranged for being translationally movable along all three coordinate axes and for being rotatable about these coordinate axes, which would allow to produce a seam along a three-dimensionally bent curve.

SUMMARY OF THE INVENTION

The object of the invention is to provide a sewing device of the type mentioned above which allows to produce seams along a freely selectable spatial curve.

According to the invention, this object is achieved by a sewing apparatus comprising: a needle system having a needle drive to drive a sewing needle; a looper system having a looper drive to drive the looper; a first carrier for supporting the needle system for translation of the needle along three translational coordinate axes and for rotation about a plurality of rotational coordinate axes; a first positioning device for positioning the needle system in space about said respective translational and rotational axes; a second carrier for supporting the looper system for translation of the needle along three translational coordinate axes and for rotation about a plurality of rotational coordinate axes; a second positioning device for positioning the looper system in space about said respective translational and rotational axes; a first electronic control unit for synchronizing the respective needle and looper drives to sew about a sewing axis; and a second electronic control unit for synchronizing the respective first and second positioning devices to maintain a predetermined spatial relationship between the needle system and looper system for sewing while traveling along a three dimensional bent curve.

The fundamental concept of the present invention thus consists in a complete mechanical separation of the needle system and the looper system—i.e., those portions of the sewing device which correspond to the conventional upper portion and lower portion of the sewing machine—and in recoupling said two portions via the electronic control means. In this way, it becomes possible to eliminate the mechanical limitations arising from the structure of known sewing devices and to make spatial sewing possible. In particular, the device of the invention thus makes it possible to sew layers of material together which have already been placed onto one another in the curved shape of the finished workpiece. Such workpieces include, e.g., bullet-proof vests, parts of airplanes, seat covers, and the like.

In order to ensure completely unlimited movement of the needle system and the looper system, advantageously the first and second positioning devices are interpolatable multi-axis CNC positioning units having positioning drives for controlling the translational and rotational movements of the respective needle and looper systems. Such positioning devices are known per se.

In principle, it would be possible to control the positioning devices independently of one another. However, the necessary precision can more easily be achieved by providing that the second control device comprises a computing unit assigned to each of the first and second positioning devices, the computing units being in a master-slave relationship. The positioning device of the one system, e.g. the looper system, is thus always controlled in such a way as to follow the positioning device of the other system, e.g., the needle system.

Mechanically, the two carriers can be completely independent of one another. However, it is also possible to movably arrange both carriers on the same base which is movable relative to a support carrying the material to be sewn.

The course of the seam can be preset, as it is commonly done in CNC positioning devices. As an alternative, the second control electronic unit stores a sewing curve to be jointly followed by the needle system and looper system, which sewing curve is previously detected by a means in the second control unit, so that the course of a given seam is detected and stored according to the so-called teach-in method.

Further, the invention relates to a method for sewing a three-dimensional bent curve by a needle system and looper system that are independently movable about three translational axes and a plurality of rotational axes, said method comprising the steps of: positioning the needle system on a needle carrier at a position on the curve; positioning the loop system on a loop carrier at an aligned position with the needle system on the curve; electronically coordinating the respective needle drive of the needle system and the looper drive of the looper system to perform a sewing operation; and electronically synchronizing operation of the carriers for the respective needle and looper systems to travel for parallel movement in space along the three dimensional bent curve; and sewing while traveling along the three dimensional bent curve.

BRIEF DESCRIPTION OF THE DRAWINGS

Further features and advantages of the invention will become apparent from the following detailed description which illustrates the invention with reference to embodiments thereof, and with reference to the accompanying drawings, wherein.

DETAILED DESCRIPTION OF THE PREFERRED EMBODIMENT

Figure 1:
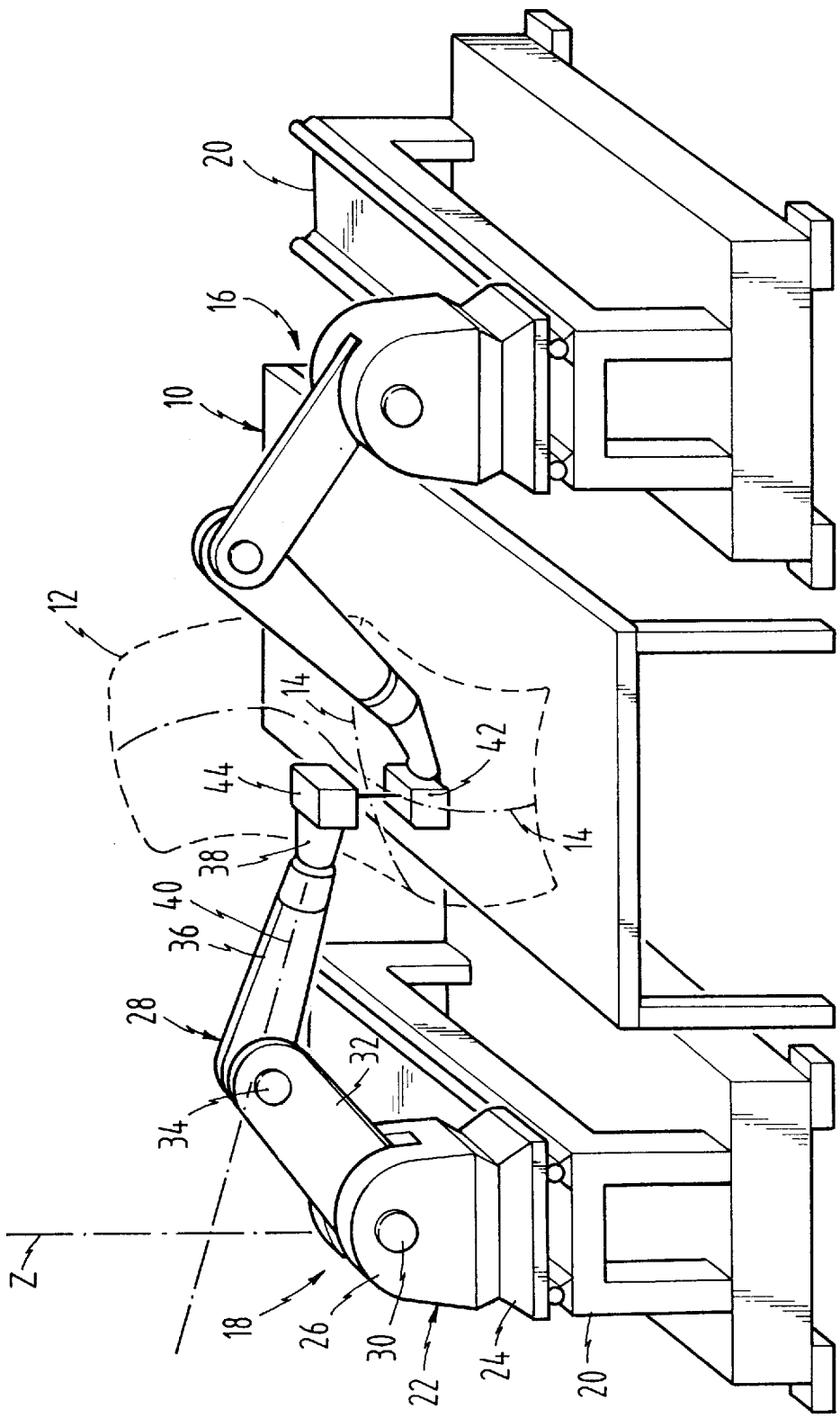
FIG. 1 shows two one-armed robots arranged on opposite sides of a support means for supporting and holding a workpiece, wherein one of said robots supports the needle system and the other the looper system.

FIG. 1 shows a support means, generally indicated by the reference numeral 10, for supporting and holding a workpiece 12 consisting of several spatially curved layers of material which are to be sewn together along the spatially curved seams 14.

On opposite sides of the support means 10, robots 16, 18 are movably arranged on a track 20 so as to be movable in the direction of the double arrow A. The robots 16, 18 are essentially identical. Each robot comprises a base 22 having a pedestal 24 and an upper portion 26 arranged on the pedestal 24 so as to be rotatable about the vertical axis Z. Each upper portion 26 supports an articulated arm 28 having a first portion 32 arranged on the upper portion 26 so as to be pivotable about an axis 30, and a second portion 36 arranged on said first portion 32 so as to be pivotable about an axis 34. On the free end of the second portion 36, a holding means 38 is arranged so as to be rotatable about the longitudinal axis 40 of the second portion 36. The positioning drives of the above-mentioned elements, which are movable relative to one another, are not shown, since the robot 16 or 18 described so far is known per se.

The holding means 38 of the robot 16 supports a looper system 42 and the looper drive, while the holding means 38 of the robot 18 supports a needle system 44 and the needle drive. The looper system 42 and the needle system 44 are manufactured by KSL GmbH, Germany. In the looper system 42 and the needle system 44, e.g. the stitch types "two-thread lock stitch" (stitch type 301) or "double chain stitch" (stitch type 401) can be used. The looper system 42 and the needle system 44 cooperate like in a conventional sewing machine, but they are completely separated from one another mechanically and are only coupled electronically via a multi-axis master-slave control. Such a multi-axis master-slave control is also manufactured by KSL GmbH, Germany (model KSL-Compact KL 120). The looper system 42 and the needle system 44 can be translationally moved by means of the robots 16, 18 parallel to the spatial axes x, y, z, and can be rotated about said axes, as it is indicated in FIG. 1.

Figure 4:
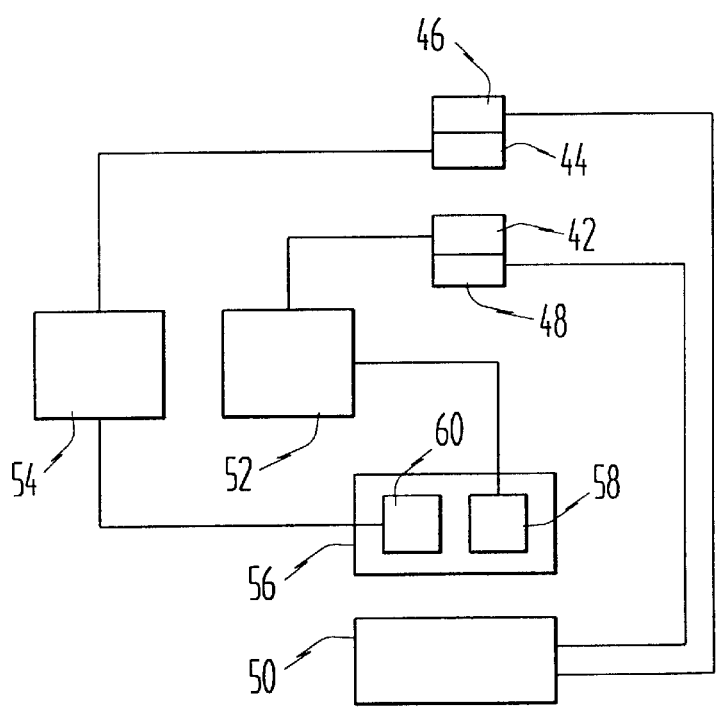
FIG. 4 is a schematic view of the controls of the sewing device according to the invention.

For a description of the electronic coupling between the needle system with the needle drive and the looper system with the looper drive, reference is made to FIG. 4. The needle drive 46 is coupled to the looper drive 48, which is mechanically independent of the needle drive, via a first electronic control unit 50 which forms an electronic synchronizing axis for the two drives 46 and 48. By means of the second control unit 50, the looper system 42 and the needle system 44 are synchronized by a 3D measuring system (not shown) which detects possible deviations from synchronization, so that the looper system 42 and the needle system 44 are kept at a constant distance from one another during the sewing process. The first control unit 50 thus acts as a simple control system.

The positioning drives of the two robots 16, 18 are each controlled via an interpolatable multi-axis CNC positioning unit 52 and 54, which units are coupled electronically via a second control means 56. The interpolatable multi-axis CNC positioning unit 52, 54 is contained in and forms part of the above-mentioned KSL-Compact KL 120 control, which control can e.g. be used here. A computing unit 58, 60 is assigned to each positioning unit 52, 54, wherein said computing units are in a master-slave relationship. It is of no importance which system is the leading (master) system and which is the following (slave) system.

The second control unit 56 is designed such that the two CNC positioning units operate in asynchronism for moving to a given sewing workpoint in space as well as for moving into the resting position, because there may be different spatial conditions for these movements for the needle system 44, on the one hand, and the looper system 42, on the other hand. During the sewing process, however, the two CNC positioning units 52, 54 for the looper system 42 and the needle system 44 are synchronized electronically for precise, mechanically independent, parallel movement in space.

The second control means 56 shown in FIG. 4 contains a memory 62 for storing the position coordinates of looper system 42 and needle system 44. These coordinates are provided by the computer units 58, 60 assigned to the positioning units 52, 54 in accordance with the current position of the positioning units 52, 54. This allows entering of the coordinates of a predetermined seam course into the memory 62 by guiding the looper system 42 and the needle system 44 jointly along a predetermined seam. This is known as the teach-in method.

Figure 2:
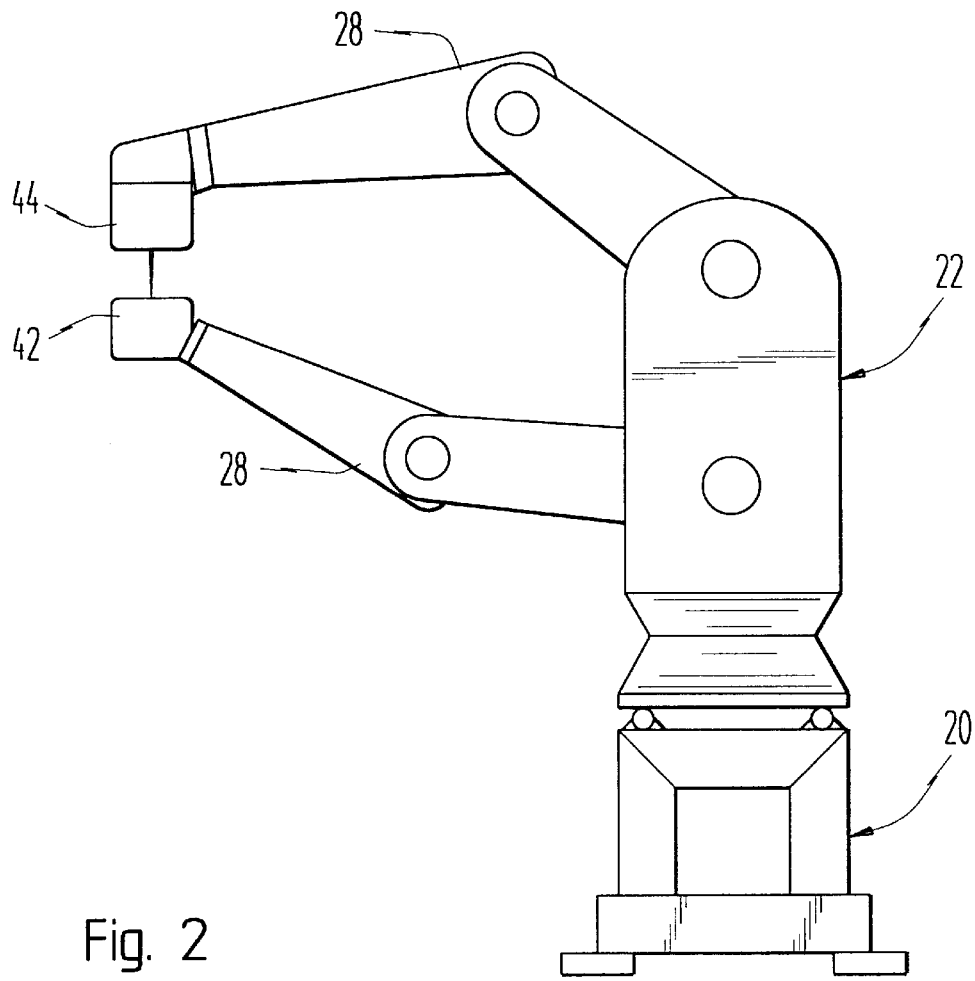
FIG. 2 is a schematic view of a two-armed robot whose one arm supports the needle system and whose other arm supports the looper system.

The embodiment according to FIG. 2 differs from the embodiment according to FIG. 1 in that the two articulated arms 28 are coupled to the same base 26. This occludes the possibility of moving the two articulated arms 28 independently of one another on a track 20. In many cases, however, this degree of freedom will not be necessary. In all other respects, however, the coupling and the control of the looper system and the needle system on the two articulated arms correspond to those of the systems arranged on the separate robots 16, 18 according to FIG. 1.

Figure 3:
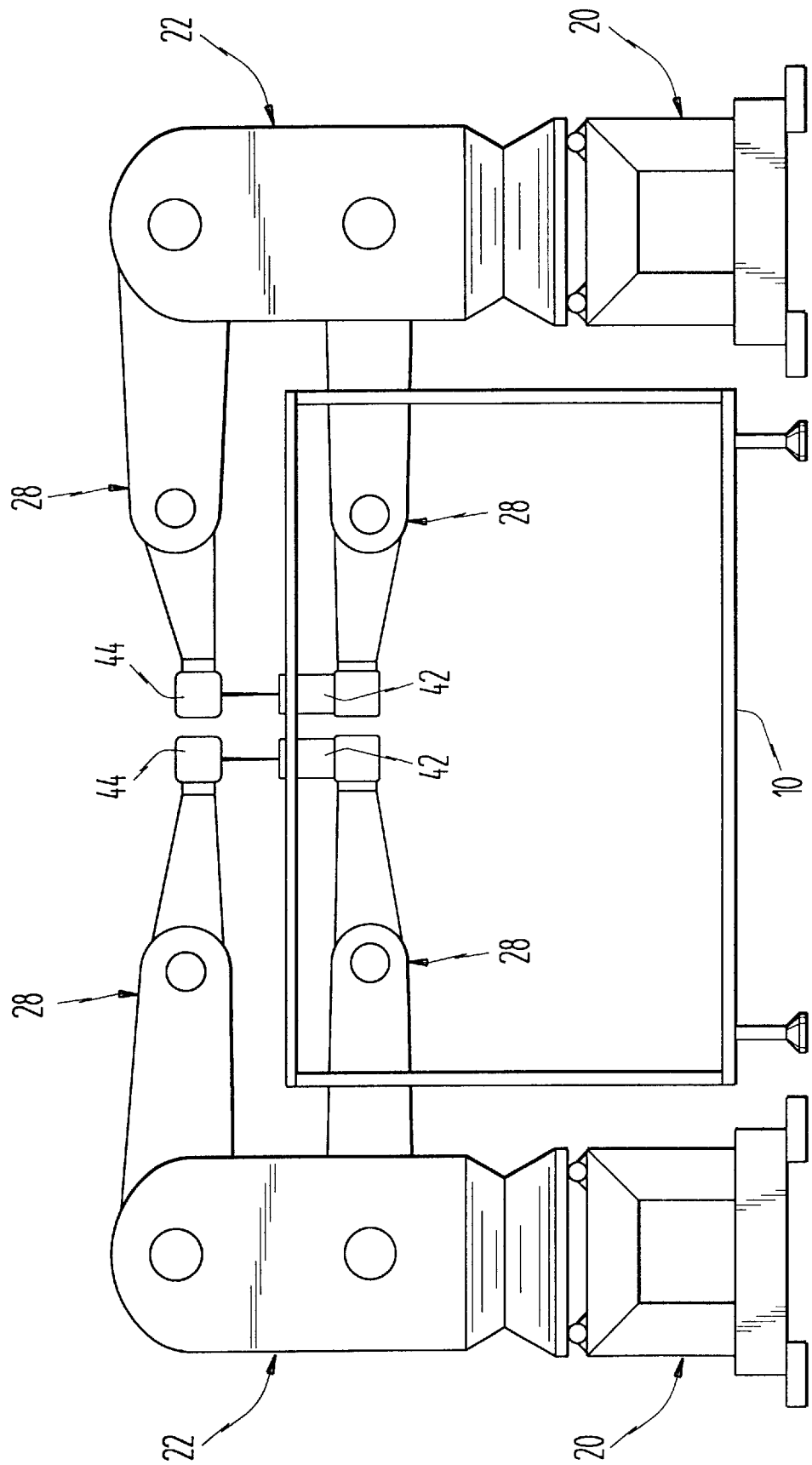
FIG. 3 is a schematic view of two two-armed robots according to FIG. 2 arranged on opposite sides of a workpiece support.

Finally, FIG. 3 shows a further alternative embodiment in which two devices according to FIG. 2 are arranged on opposite sides of a support means 10 for supporting a workpiece, so that two seams can be produced on the workpiece simultaneously. FIG. 3 shows the two sewing devices in an extreme position, with their needle systems 44 and their looper systems 42 being at a minimum distance from each other. Consequently, the two sewing devices can operate independently of one another without interfering with each other. However, if they are arranged in such a way that their paths could theoretically cross, a higher-ranking control would have to be provided for preventing a collision between the two sewing devices.

The looper system can be designed for producing lock stitch, double-thread chain stitch or single-thread chain stitch.

Figure 5:
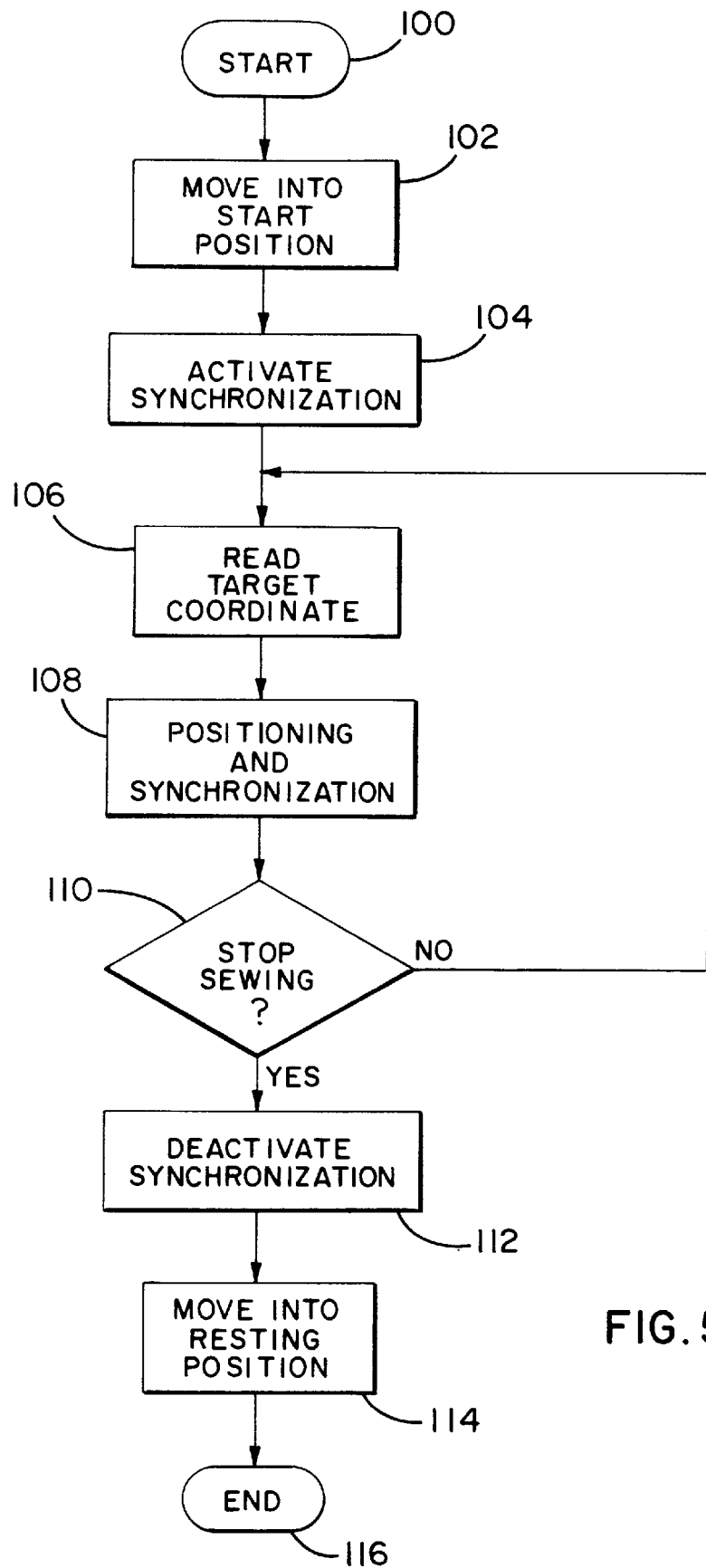
FIG. 5 is a flow chart of the method for sewing a three-dimensional bent curve.

FIG. 5 shows the flow chart of the method for sewing a three-dimensional bent curve. At the beginning of the method, (Step 100), the workpiece 12, which may consist of various pieces that are to be sewn together, is held by the support 10. Further, the robots 16 and 18 are ready for operation and the coordinates for the spatial course of the seam are stored in memory 62. These data have been obtained, e.g., by means of the teach-in method.

Then, the robots 16 and 18 move the looper system 42 and the needle system 44, respectively, into their start position. Robot 16 is controlled by control means 58, and robot 18 is controlled by control means 60. Both robots thus move into the start position for the sewing process independently of one another (Step 102).

Next, synchronization is activated (Step 104) by means of the 3D sensor whose transmitting element can e.g. be arranged on the needle system 44, and whose receiving element is in this case arranged on the looper system 42. The first electronic control unit 50 is activated and keeps the distance between the looper system 42 and the needle system 44 constant by means of a simple control loop by continuously evaluating the values measured by the 3D sensor and by controlling the two drives 46 and 48 dependent on the deviation of the distance from the desired predetermined value.

The method can now start with the sewing process (Steps 106 to 110). For this purpose, the next target coordinate to be synchronously occupied by the looper system 42 and the needle system 44 is read from the memory 62 (Step 106). Positioning is conducted by means of the positioning units 52 and 54 (Step 108). Simultaneously, the synchronization effected by the first electronic control unit 50 in conjunction with the two drives 46 and 48 ensures that the distance between the looper system 42 and the needle system 44 remains constant.

In the next step (Step 110), it is detected whether the sewing process already has to be stopped. If this is not the case, the method is continued in Step 106. The method is therefore in a loop consisting of Steps 106 to 110. Within this loop, seams are applied to the workpiece 12 along the previously determined spatial curve. The loop consisting of Steps 106 to 110 is followed until the second control means 56 detects in Step 110 that there are no further target coordinates (Step 110). In this case, synchronization is deactivated by deactivating the first electronic control means 50 (Step 112).

Following the deactivation of synchronization in Step 112, the robots 16 and 18 can be moved into a resting position by a control program contained in the second control means 56 (Step 114).

The end of the method has thus been reached (Step 116). The workpiece 12, now sewn together, can be removed from the support 10.

What is claimed is:

1. A sewing apparatus capable of producing a seam along a three-dimensional bent curve, said apparatus comprising:

a needle system having a needle drive to drive a sewing needle;

a looper system having a looper drive to drive the looper;

a first carrier for supporting the needle system for translation of the needle along three translational coordinate axes and for rotation about a plurality of rotational coordinate axes;

a first positioning device for positioning the needle system in space about said respective translational and rotational axes;

a second carrier for supporting the looper system for translation of the needle along three translational coordinate axes and for rotation about a plurality of rotational coordinate axes;

a second positioning device for positioning the looper system in space about said respective translational and rotational axes;

a first electronic control unit for synchronizing the respective needle and looper drives to sew about a sewing axis; and a second electronic control unit for operating the first and second positioning devices to provide a differential spatial relationship between the needle system and the looper system before and after the sewing operation, and for synchronizing the respective first and second positioning devices to maintain a predetermined spatial relationship between the needle system and looper system for sewing while traveling along a three dimensional bent curve.

2. An apparatus in accordance with claim 1 wherein the first and second positioning devices are interpolatable multi-axis CNC positioning units having positioning drives for controlling the translational and rotational movements of the respective needle and looper systems.

3. A sewing device according to claim 1 wherein the second control device (56) comprises a computing unit assigned to each of the first and second positioning devices, the computing units being in a master-slave relationship.

4. An apparatus in accordance with claim 1 wherein a first base is provided on the first carrier, and a second base disposed parallel to the first base is provided on the second carrier.

5. An apparatus in accordance with claim 1 wherein a support is provided for supporting the material to be sewn; and a common base is shared by the first and second carriers, and the base is movable relative to the support.

6. A method for sewing along a three dimensional bent curve by a needle system and looper system that are independently movable about three translational axes and a plurality of rotational axes, said method comprising the steps of:

positioning the needle system on a needle carrier at a position on the curve;

positioning the looper system on a loop carrier at an aligned position with the needle system on the curve;

electronically coordinating a respective needle drive of the needle system and a looper drive of the looper system to perform a sewing operation;

electronically synchronizing operation of the carriers for the respective needle and looper systems to effect parallel movement thereof in space along the three dimensional bent curve; and including the step of electronically controlling and providing a differential spatial relationship between the needle and looper systems before and after the sewing operation, said relationship being different than the parallel relationship therebetween when sewing along the bent curve.

7. A method in accordance with claim 6 including the step of positioning the needle and looper carriers with interpolatable CNC units and arranging the CNC units in a master-slave relationship.

8. A method in accordance with claim 6 including the step of moving the needle system on a first carrier and moving the looper system on a separate second carrier discrete from the first carrier.

9. A method in accordance with claim 6 including the step of mounting the needle system and looper system on a common base and moving the common base to move them simultaneously relative to a support carrying the material to be sewn.

\* \* \* \* \*